United States Patent
Sherlock (10) Patent No.: US 11,775,443 B2
(45) Date of Patent: Oct. 3, 2023

(54) SUPERVISORY MEMORY MANAGEMENT UNIT (71) Applicant: HEWLETT PACKARD ENTERPRISE DEVELOPMENT LP, Houston, TX (US)

(72) Inventor: Derek Alan Sherlock, Boulder, CO (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 551 days.

(21) Appl. No.: 15/323,700

(22) PCT Filed: Oct. 23, 2014

(86) PCT No.: PCT/US2014/061965
§ 371 (c)(1),
(2) Date: Jan. 3, 2017

(87) PCT Pub. No.: WO2016/064403
PCT Pub. Date: Apr. 28, 2016

(65) Prior Publication Data
US 2017/0153983 A1 Jun. 1, 2017

(51) Int. Cl.
*G06F 12/1027* (2016.01)
*G06F 11/07* (2006.01)
(Continued)

(52) U.S. Cl.
CPC ........ *G06F 12/1027* (2013.01); *G06F 11/073* (2013.01); *G06F 11/0793* (2013.01);
(Continued)

(58) Field of Classification Search
CPC ............... G06F 12/1027; G06F 12/145; G06F 12/1009; G06F 11/073; G06F 11/0793;
(Continued)

(56) References Cited

U.S. PATENT DOCUMENTS 6,430,657 B1 8/2002 Mittal et al.
6,886,090 B1 4/2005 Campbell
(Continued)

FOREIGN PATENT DOCUMENTS

| CN | 1617111 A | 5/2005 |
|---|---|---|
| EP | 1182569 A1 | 2/2002 |
| TW | 201433917 A | 9/2014 |

OTHER PUBLICATIONS

Shimpi, Anand, "AMD—The Road Ahead," May 11, 2007, Anandtech, https://www.anandtech.com/show/2229/3 (Year: 2007).*

(Continued)

*Primary Examiner* — Michael Krofcheck
(74) *Attorney, Agent, or Firm* — Yao Legal Services, Inc.

(57) ABSTRACT

A system includes a central processing unit (CPU) to process data with respect to a virtual address generated by the CPU. A first memory management unit (MMU) translates the virtual address to a physical address of a memory with respect to the data processed by the CPU. A supervisory MMU translates the physical address of the first MMU to a storage address for storage and retrieval of the data in the memory. The supervisory MMU controls access to the memory via the storage address generated by the first MMU.

20 Claims, 6 Drawing Sheets (51) Int. Cl.
*G06F 12/14* (2006.01)
*G06F 12/1009* (2016.01)
*G06F 12/1081* (2016.01)

(52) U.S. Cl.
CPC ...... *G06F 12/1009* (2013.01); *G06F 12/1081* (2013.01); *G06F 12/145* (2013.01); *G06F 12/1466* (2013.01); *G06F 2212/1052* (2013.01); *G06F 2212/651* (2013.01); *G06F 2212/657* (2013.01); *G06F 2212/681* (2013.01); *G06F 2212/684* (2013.01)

(58) Field of Classification Search
CPC ............. G06F 12/1081; G06F 12/1466; G06F 2212/684; G06F 2212/651; G06F 2212/1052; G06F 2212/657; G06F 2212/681
See application file for complete search history.

(56) References Cited

U.S. PATENT DOCUMENTS

| | | | |
|---|---|---|---|
| 7,925,859 B2 | 4/2011 | Banerjee et al. | |
| 8,108,641 B2 | 1/2012 | Goss et al. | |
| 8,635,428 B2 | 1/2014 | Karlsson et al. | |
| 8,751,830 B2* | 6/2014 | Muff | G06F 21/6218 713/193 |
| 2002/0069327 A1 | 6/2002 | Chauvel | |
| 2005/0108497 A1 | 5/2005 | Bridges et al. | |
| 2006/0271760 A1 | 11/2006 | Nicolai | |
| 2007/0168643 A1* | 7/2007 | Hummel | G06F 12/1081 711/207 |
| 2008/0109592 A1* | 5/2008 | Karamcheti | G06F 12/10 711/103 |
| 2009/0287902 A1* | 11/2009 | Fullerton | G06F 12/1036 711/206 |
| 2010/0299667 A1* | 11/2010 | Ahmad | G06F 12/1036 718/1 |
| 2011/0023027 A1* | 1/2011 | Kegel | G06F 12/10 718/1 |
| 2012/0117301 A1 | 5/2012 | Wingard | |
| 2013/0024598 A1* | 1/2013 | Serebrin | G06F 12/1036 711/6 |
| 2013/0086309 A1* | 4/2013 | Lee | G06F 12/0246 711/103 |
| 2013/0179642 A1* | 7/2013 | Plondke | G06F 12/0811 711/142 |
| 2013/0318323 A1 | 11/2013 | Weissmann et al. | |
| 2014/0006681 A1* | 1/2014 | Chen | G06F 12/1027 711/3 |
| 2014/0380317 A1* | 12/2014 | Merrill | G06F 7/506 718/100 |
| 2015/0089150 A1* | 3/2015 | Kessler | G06F 12/1045 711/139 |
| 2015/0089185 A1* | 3/2015 | Brandyberry | G06F 11/2058 711/207 |
| 2015/0199279 A1* | 7/2015 | Haugan | G06F 12/1009 711/133 |
| 2015/0199280 A1* | 7/2015 | Molnar | G06F 12/1027 711/207 |
| 2016/0371496 A1* | 12/2016 | Sell | G06F 12/14 |

OTHER PUBLICATIONS

Virtual address definition, "Free On-Line Dictionary of Computing," Jan. 2, 2001, http://foldoc.org/virtual%20address (Year: 2001).*
Physical address definition, "Free On-Line Dictionary of Computing," Mar. 31, 1995, http://foldoc.org/physical+addresses (Year: 1995).*
Permission definition, "Free On-Line Dictionary of Computing," Dec. 7, 2000, http://foldoc.org/permission (Year: 2000).*
Address space definition, "Free On-Line Dictionary of Computing," Nov. 1, 1999, http://foldoc.org/address%20space (Year: 1999).*
Page fault definition, "Free-On-Line Dictionary of Computing," Nov. 11, 1995, http://foldoc.org/page+fault (Year: 1995).*
International Search Report and Written Opinion; PCT/US201/061965; dated Jun. 22, 2015; 14 pages.

* cited by examiner

SUPERVISORY MEMORY MANAGEMENT UNIT

BACKGROUND

Today's central processing unit (CPU) architectures often implement a single tier of memory management implemented in a memory management unit (MMU) of the CPU, used to manage a corresponding single tier of volatile main memory (e.g., DRAM). The MMU utilizes a translation cache often referred to as a translation lookaside buffer (TLB), backed by storage referred to as a page table (PT), and a hardware or software device for populating the TLB on demand from the PT, sometimes referred to as a page walker (PW). The MMU can also include logic to check access permissions, test fault conditions, and if necessary generate a synchronous page fault (PF)—which results in the execution by the CPU of a handler routine referred to as a page fault handler (PFH).

DETAILED DESCRIPTION

This disclosure relates to a memory management architecture that employs a supervisory memory management unit (MMU) (or units) to control access to a common memory storage area that can be accessed by multiple processing entities. Each processing entity can include one or more central processing units (CPUs) having one or more cores to perform processing to the common memory storage area. The respective CPUs can include a first memory management unit (MMU) (also referred to as a first tier MMU) to perform an initial address translation from the CPU's virtual address space to a physical address space relating to the common storage area. Rather than a direct physical mapping to the common storage area via the generated physical address, the supervisory MMU performs a second address translation (also referred to as second tier translation) by translating the physical address to a storage address of the common storage area. Such second-tier translation obviates the need for the CPU to perform its own translation to the common memory storage area while also protecting its data from other less trusted entities that also access the common memory storage area.

The supervisory MMU can control permissions to the common storage area and thus allow multiple CPU's to access the memory in a secure manner (e.g., not allowing a non-trusted CPU to access data of another CPU). For example, the supervisory MMU can determine which areas of the common memory storage area can be accessed by any given CPU based on permissions stored in a page table. If an access to a common memory area is requested that a given CPU does not have requisite permission to access, for example, a fault can be generated that can initiate further fault processing by the supervisory MMU and the CPU that generated the fault. In addition to second-tier address translation, permissions control, and fault handling, the supervisory MMU can perform tasks such as page table processing, page fault handling, paging operations, memory swapping, copying on memory writes, allocating on reads, among many other functions as disclosed herein.

Figure 1:
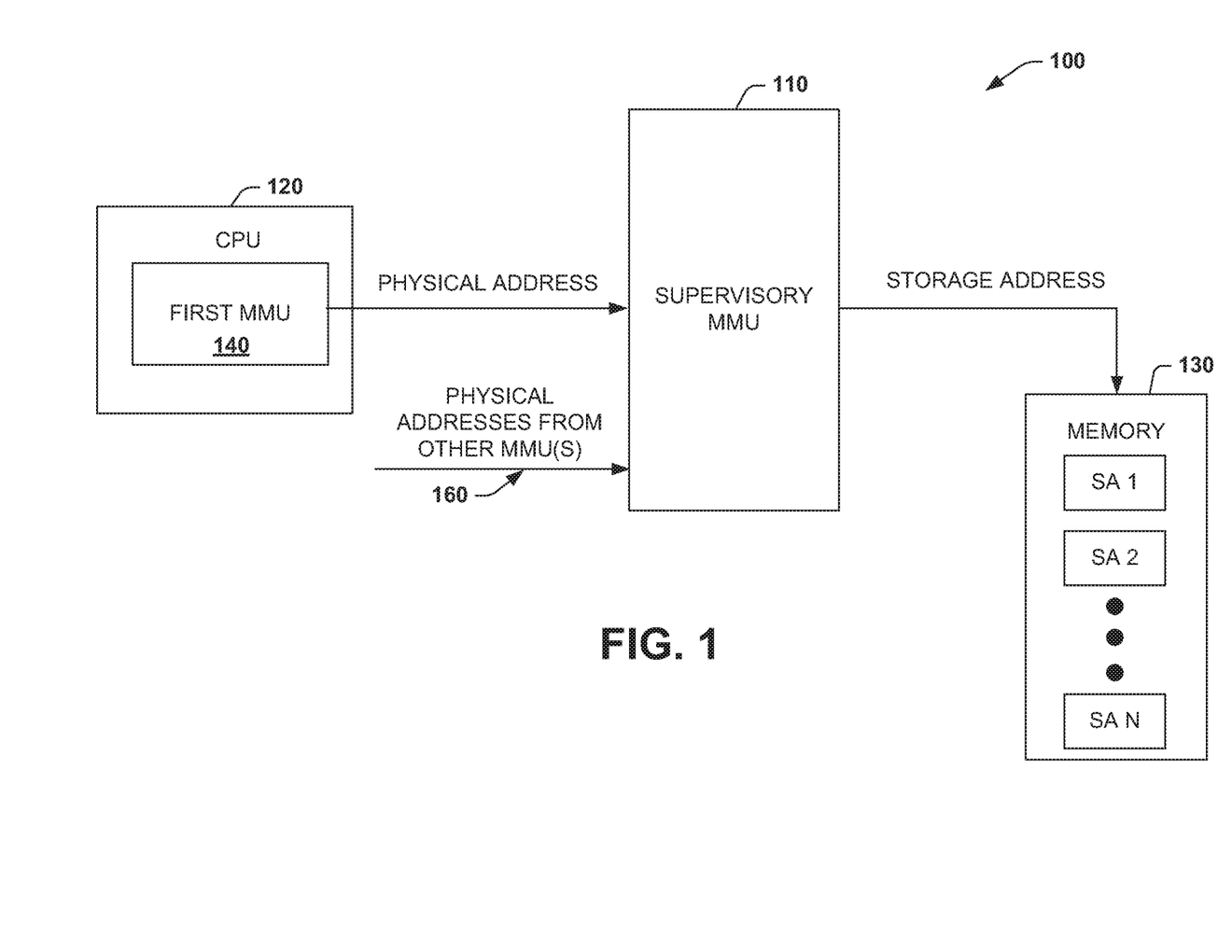
FIG. 1 illustrates an example of a system that employs a supervisory memory management unit to control access to a common memory storage area utilized by multiple processing units.

FIG. 1 illustrates an example of a system 100 that employs a supervisory memory management unit (MMU) 110 to control access to a common memory storage area utilized by multiple processing units. The system 100 includes a central processing unit (CPU) 120 to process data with respect to a virtual address generated by the CPU. As used herein, the term virtual address refers to internal addresses used within the CPU 120 that are employed to operate processes and threads, and are abstracted from physical addresses by the address translations performed in the CPU's first-tier MMU. Although not shown (See e.g., FIG. 2), the CPU 120 can include multiple processing cores to perform processing of programs and data. As used herein, the term CPU can include a single core or can include multiple cores where each core is given similar or dissimilar permissions by the supervisory MMU 110 to access a memory 130. The CPU 120 can also be bundled with other CPU's to perform a server and/or client function, for example. Multiple servers and/or clients can be employed to access the memory 130 via the supervisory MMU 110 (or MMU's). Thus, the supervisory MMU 110 can control and facilitate access to the memory 130 with respect to a single CPU core, multiple CPU cores, multiple CPU chips or modules, multiple servers, and/or multiple clients, for example. For purposes of brevity with respect to FIG. 1, a single CPU 110 is illustrated. Multiple core and multiple CPU examples are illustrated and described below with respect to FIGS. 2-4.

The CPU 120 includes a first memory management unit (MMU) 140 to translate the virtual address generated by the CPU cores to a physical address of the memory 130 with respect to the data processed by the CPU. In a conventional system, the physical address would be directly applied as an address of the memory 130 for storage and retrieval of data. In the system 100 however, the supervisory MMU 110 translates the physical address of the first MMU 140 to a storage address for storage and retrieval of the data in the memory 130. The storage addresses are shown as SA 1, SA 2, through SA N in the memory 130, where N represents a positive integer. Each of the storage addresses SA 1 though SA N can also represent a block of memory addresses, often referred to as a page. The memory 130 can be a non-volatile storage in one example, a volatile storage in another example, or a combination of volatile and non-volatile storage. The supervisory MMU 110 controls access to the memory 130 via the storage address associated with the first MMU 140.

In one example function of the supervisory MMU 110, the supervisory MMU controls access to the memory 130 (also referred to as common memory storage area) that can be accessed by multiple processing entities such as via read or write requests from the CPU 120 and read or write requests from other CPU's at 160. As noted previously, each processing entity can include a central processing unit (CPU) having one or more cores to perform processing to the common memory storage area 130. The respective CPU's can include a first memory management unit (MMU) (also referred to as a first tier MMU) to perform an initial address translation from the CPU's virtual memory to a physical address.

Rather than a direct physical mapping to the common storage area via the generated physical address, the supervisory MMU 110 performs a second address translation (also referred to as second tier translation) by translating the physical address to a storage address of the memory 130. Such second-tier translation obviates the need for the CPU 120 to perform its own translation to the memory 130 while automatically protecting its data from other less trusted entities that also access the common memory storage area.

The supervisory MMU 110 can determine which areas of the common memory storage area 130 can be accessed by any given CPU (e.g., determined by the storage page table that defines permissions for each CPU). In one example, the CPU 120 may be given permission over memory blocks designated by SA 1 and SA 2 but denied access to other blocks which can be granted to other CPU's. If a common memory area in the memory 130 is requested that a given CPU does not have requisite permission to access, for example, a fault can be generated (See e.g., FIG. 2) that can initiate further fault processing by the supervisory MMU 110 and the CPU that generated the fault. Permissions could also be specified separately for reads versus writes versus instruction fetches, in one example.

Figure 2:
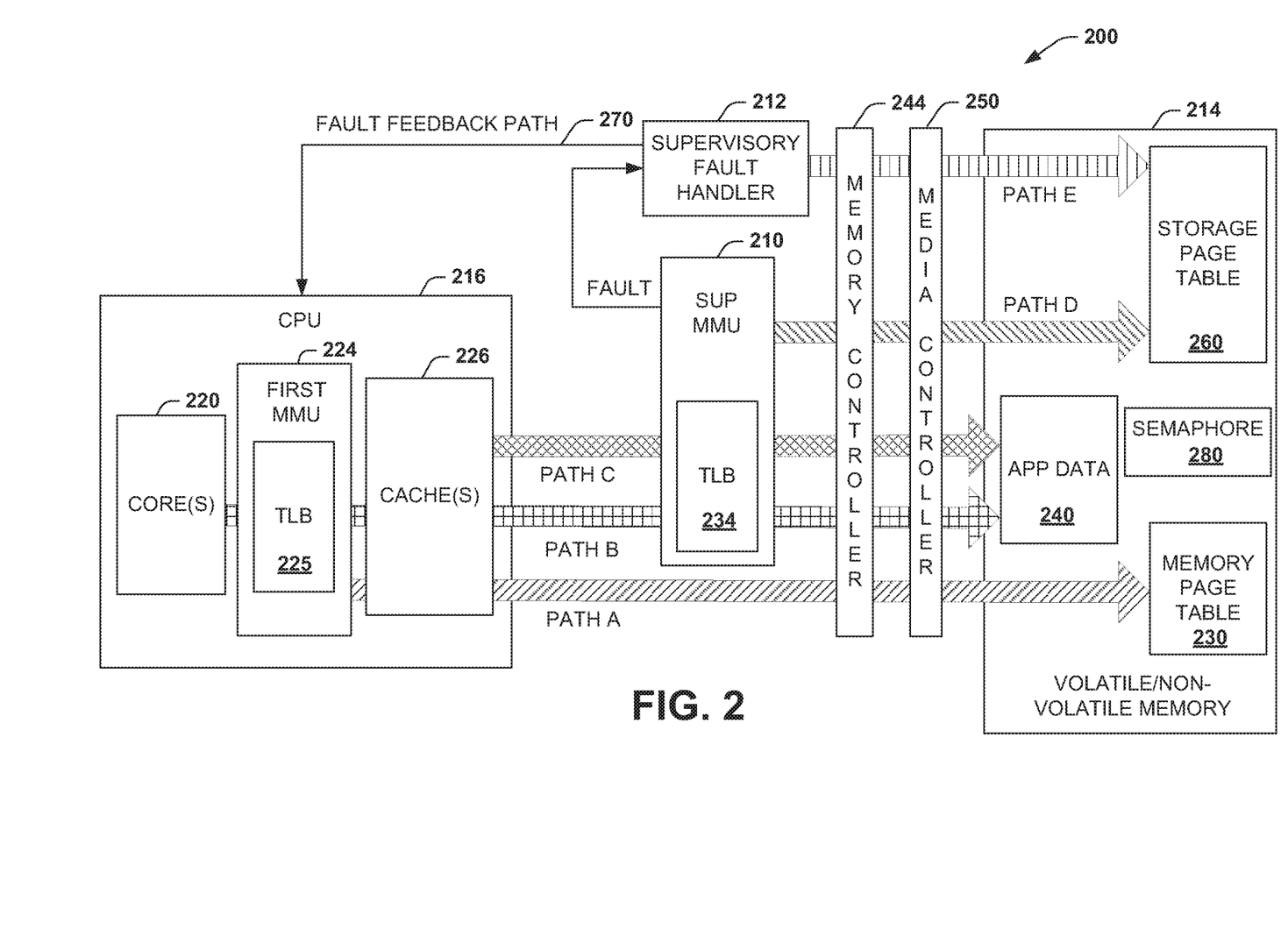
FIG. 2 illustrates an example of a system that employs a supervisory memory management unit and supervisory fault handler to control access to a common memory storage area.

MMU operation can also include page table accesses to the memory 130 in the event that the supervisory MMU 110 cannot locate a given storage address in its internal buffer (See e.g., FIG. 2). In addition to second-tier address translation, permissions control, and fault handling, the supervisory MMU 110 can perform tasks such as page table processing, page fault handling, paging operations, memory swapping, copying on memory writes, allocating on reads, among many other functions as disclosed herein.

Although the multi-tiered system 100 is can be employed to manage non-volatile memories 130, volatile memory management can also be performed by the system 100. For example, the supervisory MMU 110 can allocate trusted areas of volatile memory such that only those CPU's having the requisite permission can access. Such volatile management examples can be utilized for a communications architecture between multiple servers/clients, for example, where trusted memory areas are reserved for in-server use and common storage areas are utilized for communications between servers. For example, the supervisory MMU 110 controls access to the common and the trusted areas of volatile memory based on the permissions of a given request.

The following describes example difference between conventional single-tiered MMU systems and the multi-tiered system 100 depicted in FIG. 1. Conventional CPU architectures often implement a single tier of memory management implemented in a first tier memory management unit (MMU), used to manage a corresponding single tier of volatile main memory (e.g. DRAM). The single tier MMU architecture uses a translation cache often referred to as a translation lookaside buffer (TLB), backed by storage referred to a page table (PT), a hardware or software device for populating the TLB on demand from the PT, referred to as a page walker (PW), as well as logic to check access permissions, test fault conditions, and if necessary generate a synchronous page fault (PF)—which results in the execution by the CPU of a handler routine referred to as a page fault handler (PFH).

A responsible layer of privileged software in single tier systems, typically an operating system, driver, hypervisor, or some combination thereof, manages the content of the page tables on behalf or multiple processes, each of which has a virtual memory (VM) map, that is to be translated into a portion of a common shared physical address (PA) map. This privileged software also manages, with the assistance of the single tier MMU features such as the PF mechanism, the creation, deletion, and transition between storage tiers of regions (called pages) of virtual memory space. These operations can take many forms and have many names, such as paging in, paging out, swapping, copying on write, allocating on read, and so forth.

An emerging trend in computer architecture is the attachment of load/store access-models to non-volatile memory to serve the combined needs of both primary memory and storage. The load-store methodology allows software to access data structures directly within non-volatile memory, without relying on traditional block-based input/output (I/O) storage models. This can be of benefit since data resides persistently in a single location, avoiding the overheads and inefficiencies of blocking and de-blocking, copying between application and operating system buffers, and copying between operating system buffers and storage devices. Thus, access to durable storage becomes a single direct, simple load or store operation, without the costly performance overheads of extra data movement, privilege escalation, and so forth.

Non-volatile load/store-accessed memory, in one example, has address management needs that exceed the capabilities of a single tier MMU designed only for volatile main memory management. Additional address translation should also be performed, for example, which cannot be supplied by a single-tier system. For example, the VA-to-PA translation performed in a conventional CPU MMU serves to isolate processes' virtual address spaces from each other, and to map them to required storage free of contiguity or fragmentation requirements, to adjust them dynamically based upon program demands, and to transition regions between storage tiers when needed. Implicit in all these operations is the assumption that all free pages of DRAM are fungible. Any virtual address page can be mapped to any DRAM page based only upon demand and availability. When mapped, a DRAM page's content makes it unique, but when returned to a free pool it thus again becomes fungible.

Non-volatile memory however does not have this same fungibility property. Pages of non-volatile memory have an identity that should be preserved even when they are not currently mapped to any given physical or virtual address—just as files in a traditional disk file system preserve their data layout and content when they are not being read, and when the computer is not powered on. Thus, a management function is needed whereby each page of storage in non-volatile memory has some unambiguous identification "label" that can be used to repeatedly identify the same page, regardless of any virtual-to-physical mappings present at the time. This unambiguous identification may take many forms—for example, it may appear like a volume name and file system path, or some equivalent concept reduced to numbers such as a logical unit number (LUN) and a block offset.

In one single tier architecture, the label may be described by a redundant array of independent disks (RAID) group universally unique identifier (UUID) and RAID-group-relative offset address, or by a virtual volume UUID and a virtual-volume relative offset address. Whatever form the unambiguous identifier takes, such identifier can also be referred to as a "storage address" (SA). It may also be the case that the storage addresses accessible to a given CPU are a subset of a larger combined SA space, shared by many other processors, with possibly complex patterns of access permissions and mappings to be resolved—some mappings being exclusive, and others shared between CPUs. This type of mapping from CPU physical address to storage address—is an operation calling for similar memory management functions for which the first tier on-chip CPU MMU was designed—namely, address translation, page table consultation, page walking, page faulting, and so forth. Unfortunately, conventional CPUs only have one single MMU, rather than multiple MMU tiers as disclosed herein.

It is noted that simply combining both virtual-to-physical and physical-to-storage addresses into a single combined translation managed by a single MMU is not in general a viable option. This technique would present difficulties because of trust levels between different processing entities. For example, the privileged memory management code running in an operating system needs to have full access to view and alter page table content for some aspects of the translation—e.g., to enforce isolation between virtual address spaces of different processes—yet may not be trusted to modify page table content for other aspects—e.g., controlling which subset of a SA space it gives itself permissions to access. In general, memory management should be trusted to privileged OS software running in-band on the server, whereas storage management of a pool of storage shared by multiple servers should be handled by a more trusted separate storage management entity such as the supervisory MMU 110 disclosed herein, rather than any one of the servers.

FIG. 2 illustrates an example of a system 200 that employs a supervisory memory management unit (MMU) 210 and supervisory fault handler 212 to control access to a common memory storage area shown as memory 214. Similar to FIG. 1 above, the memory 214 can include volatile and/or non-volatile storage. The system 200 includes a central processing unit (CPU) 216 having one or more cores 220 to perform processing in accordance with internal operations of the CPU and the memory 214. A first MMU 224 performs a first tier address translation of virtual memory to physical memory for the cores 220. The first MMU 224 includes a first translation lookaside buffer (TLB) 225 to facilitate the first tier address translation. The CPU 216 can also include one or more caches 226 to store data or instructions on chip. If a read or write request is made to the cache 226 that cannot be located within the cache, an external read or write request can be issued to the supervisory MMU 210 to store or retrieve data from the memory 214.

As shown, the CPU 216 can support various data paths in the system 200. A path A can be employed that can bypass the supervisory MMU to access a memory page table 230 if a TLB cache miss is encountered with cache 226. The path A can support page walk reads to the memory page table 230. A path B originates at the core 200 and proceeds through the TLB 225 and cache 226. The path B proceeds though a second TLB 234 in the supervisory MMU 210 to access application data 240 (also referred to as APP data).

The Path B supports in-band reads, for example, that occur via processing by the core 220 and first MMU 224.

During path B operations, the supervisory MMU 210 performs a physical address to storage address translation via the TLB 234 to access the application data 240. A third path C can also be supported by the CPU 216. The path C originates from the cache 226 and proceeds through the supervisory MMU 210 and TLB 234 to the application data 240. Path C supports writes that are issued from the cache 226 that can result from cache pressure eviction, for example (e.g., available cache space for read not available in cache and thus transferred to external memory).

One or more components can support path operations between the CPU 216, supervisory MMU 210, and memory 214. Such components can be provided as part of a memory bus architecture, for example. These can include a memory controller 244 and/or a media controller 250, for example. In some examples, the functions of the memory controller 244 and media controller 250 can be combined into a single integrated circuit. The media controller 250 controls aspects of the memory interface that are specific to the type of medium attached (e.g. various non-volatile memory types, DRAM, flash, and so forth). These may include, for example, media-specific decoding or interleave (e.g., Row/Column/Bank/Rank), media-specific wear management (e.g., Wear Leveling), media-specific error management (e.g., FCC correction, CRC detection, Wear-out relocation, device deletion), and/or media-specific optimization (e.g. conflict scheduling). The memory controller 244 controls aspects of the memory interface that are independent of media, but specific to the CPU or system features employed. This may include, for example, system address decoding (e.g., interleaving between multiple media controllers, if there are more than one), and redundancy features, for example (e.g., RAID, mirroring, and so forth).

Other example paths supported in the system 200 include a path which runs from the supervisory MMU 210 to a storage page table 260. The storage page table is utilized when cache misses occur in the supervisory MMU 210. The path can be employed, for example, for page walk reads when second tier cache misses occur in the supervisory MMU 210's TLB 234, for example. A path E can originate from the external fault handler 212 which responds to a fault output (FAULT) from the supervisory MMU 210. As shown, path E can also access the storage page table 260. The fault handler 212 can also provide a fault feedback path 270 to the CPU 216 to notify it that a second-tier fault has been issued by the supervisory MMU 210.

The respective first-tier MMUs such as MMU 224 typically consult their respective page tables to determine permissions, address mappings and other attributes on behalf of a read or write to a virtual address. When the MMU 224 looks up a virtual address, the memory page table 230 informs the MMU 224 not only what physical address the virtual address is mapped to, but also what permissions and other attributes apply to that mapping. The memory page table 230 may be structured such that different processes under the operating system have distinct mappings, attributes, and permissions. If permissions enumerated in the table prohibit the read or write from completing, a page fault may be generated, and a software page fault handler (PFH) executed by the CPU 216 may or may not be able to correct the permissions stored in the memory page table 230 and thus re-issue the read or write with a successful outcome. If the MMU 224 cannot correct the permissions (e.g., since what was being requested is illegal) then fault handler software on the CPU 216 may take whatever action is appropriate. Often this is to terminate the process that has made the illegal request. However, first-tier MMUs 224 govern only permissions for access to physical address ranges. This is adequate for an operating system controlling access to physically-mapped resources by non-privileged processes under its supervision.

The supervisory MMU 210 and its supervisory fault handler 212 supervise the access permissions to storage addresses, on behalf of a read or write to a physical address that has already been translated from virtual by the first-tier MMU 224. The supervisory MMU 210 consults its storage page table 260 to determine permissions, address mappings and other attributes. The supervisory/storage page table 260 may be structured such that different CPUs, servers, and/or clients have distinct mappings, attributes, and permissions. When the supervisory MMU 210 looks up a physical address, the storage page table 260 informs the MMU 210 not only what storage address the physical address is mapped to, but also what permissions and other attributes apply to that mapping. If permissions enumerated in the storage page table 260 prohibit the read or write from completing, corrective action may be needed, analogous to a page fault, but implemented in a trusted supervisory fault handler 212 rather than in the CPU that issued the read or write.

While the supervisory fault handler 212 is taking action, the read or write waiting for the physical-to-storage mapping can be held in abeyance. When the supervisory fault handler 212 has completed its actions, possibly including updating the storage page table 260 to alter permissions, the MMU 210 may re-attempt the physical-to-storage translation. The read or write may then be able to complete with corrected permissions. If the supervisory fault handler 212 cannot correct the permissions (e.g., since what was being requested is illegal) then the supervisory MMU 210 may return an error response code to the CPU 216 via feedback path 270. Unlike first-tier MMUs 224, the supervisory MMU 210 governs permissions for access to storage address ranges. Since the supervisory MMU 210 and supervisory fault handler 212 may operate outside of and independent of any of the CPUs 216, they can provide a more trusted tier of management on behalf of storage than the tier implemented in the CPUs' MMUs 224. Thus, storage may be managed on behalf of many un-trusted CPUs, servers and clients by a trusted entity such as the supervisory MMU 210.

In one example, the supervisory MMU 210 can be implemented outside of the CPU 216 in external logic, although it can also be integrated into the CPU, in other examples. The supervisory MMU 210 can be downstream of the first tier MMU 224, between any of the CPU cache tiers, or downstream of the final cache tier in other examples. The supervisory MMU 210 can have similar functionality to the first MMU 224, including the TLB, page table (PT), page fault (PF) capability, address translation, and so forth. In one example, the TLB 234 consultation occurs for every last-level cache miss. Thus, it can be associated with coherent-region memory reads, for example. It can also be associated with cache evictions (writes), as noted previously.

The page fault capability of the supervisory MMU 210 can cause the CPU 216 to execute a page fault handler (PFH) similar to one that may occur in a "standard" page fault from a traditional first-tier MMU. For this to occur, the CPU 216 would be modified from an off-the-shelf CPU to receive input from the fault feedback path 270 to execute the PFH. However, if the CPU is an unmodified off-the-shelf unit, this is not possible, since current state of the art CPUs provide no mechanism to enter a synchronous fault handler in response to any condition detected any time after successful first-tier MMU address translation.

In addition to the capability to cause a page fault handler to run on the CPU 216 that incurred the fault, a capability is also provided to cause the fault handler 212 to run on some other CPU (or state machine), such as a more privileged storage management processor which in this example is shown as the supervisory fault handler 212. This capability allows fault-triggered behaviors that can manipulate storage-tier Page Tables (PTs), without giving direct access permissions to these tables to the less trusted CPU that took the fault. One example mechanism to signal the faulted CPU can be provided via a polled semaphore 280 of the completion of the PFH code on the storage management CPU 212, so that the faulted CPU 216 can end its own PFH and resume normal operations.

As noted previously, the system 200 supports storage-related address translation in load/store-accessed non-volatile memory (e.g., to support volume virtualization, partitioning, RAID, copy-on-write, migration, and so forth). The system 200 provides separation of responsibilities between memory and storage management, by segregating their functions into different MMUs with distinct page tables under the control of distinct software or hardware entities—thereby allowing storage to be suitably shared between different servers with each server only being trusted with its own data.

Figure 3:
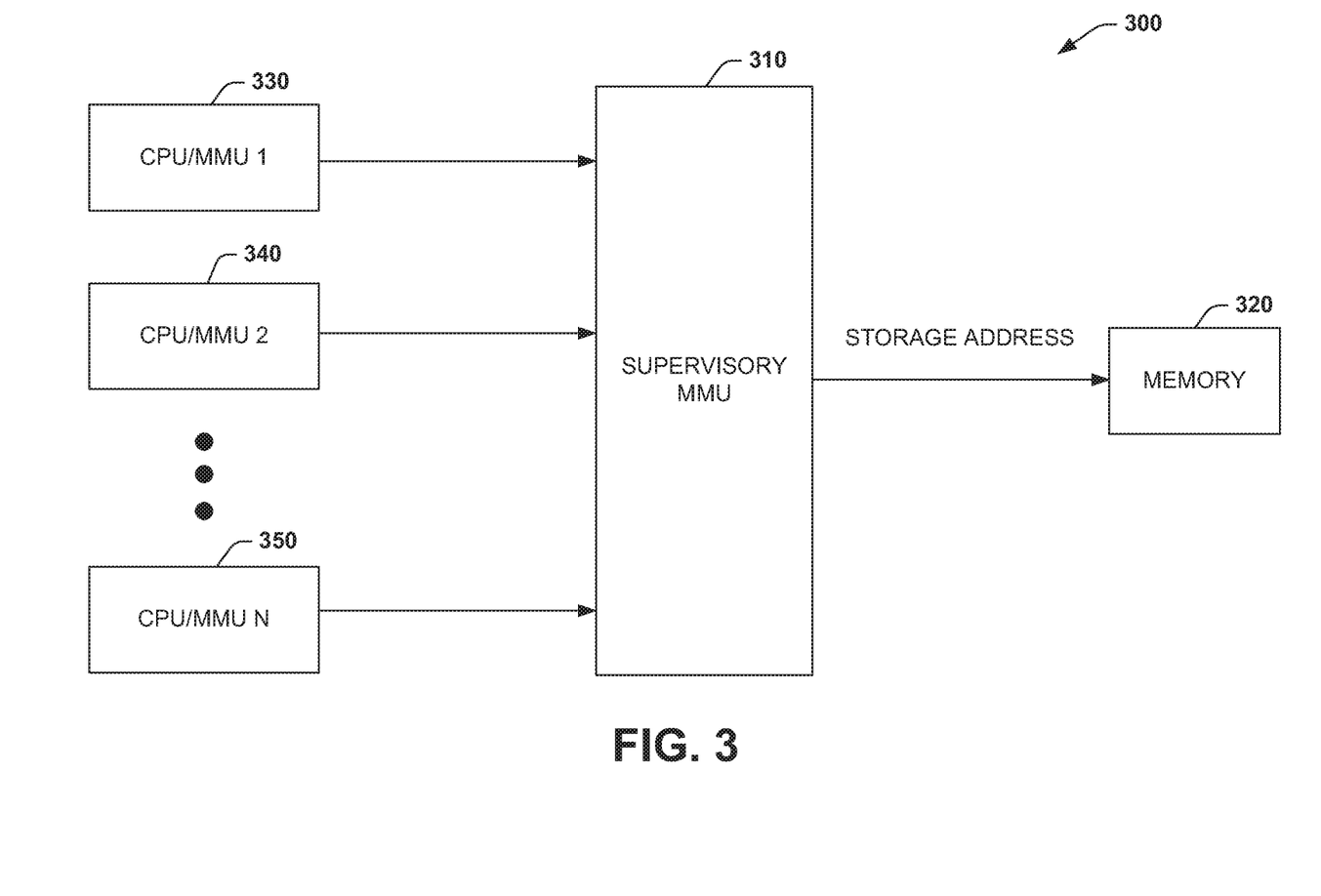
FIG. 3 illustrates an example of multiple processing units feeding a single supervisory memory management unit to control access to a common memory storage area.

FIG. 3 illustrates an example of multiple processing units feeding a single supervisory memory management unit (MMU) 310 to control access to a common memory storage area 320. In this example, multiple CPU/MMU combinations are shown at 330 though 340. Each of the respective CPU/MMU 330-340 generate reads or writes to physical addresses as previously described (See e.g., FIGS. 1 and 2). Reads and writes to physical addresses from each of the CPU/MMU 310 through 340 are fed to the supervisory MMU 310 which generates a corresponding storage address for the memory 320. As noted above, the supervisory MMU 310 can include fault handling capabilities in addition to address translation capability as described herein.

Figure 4:
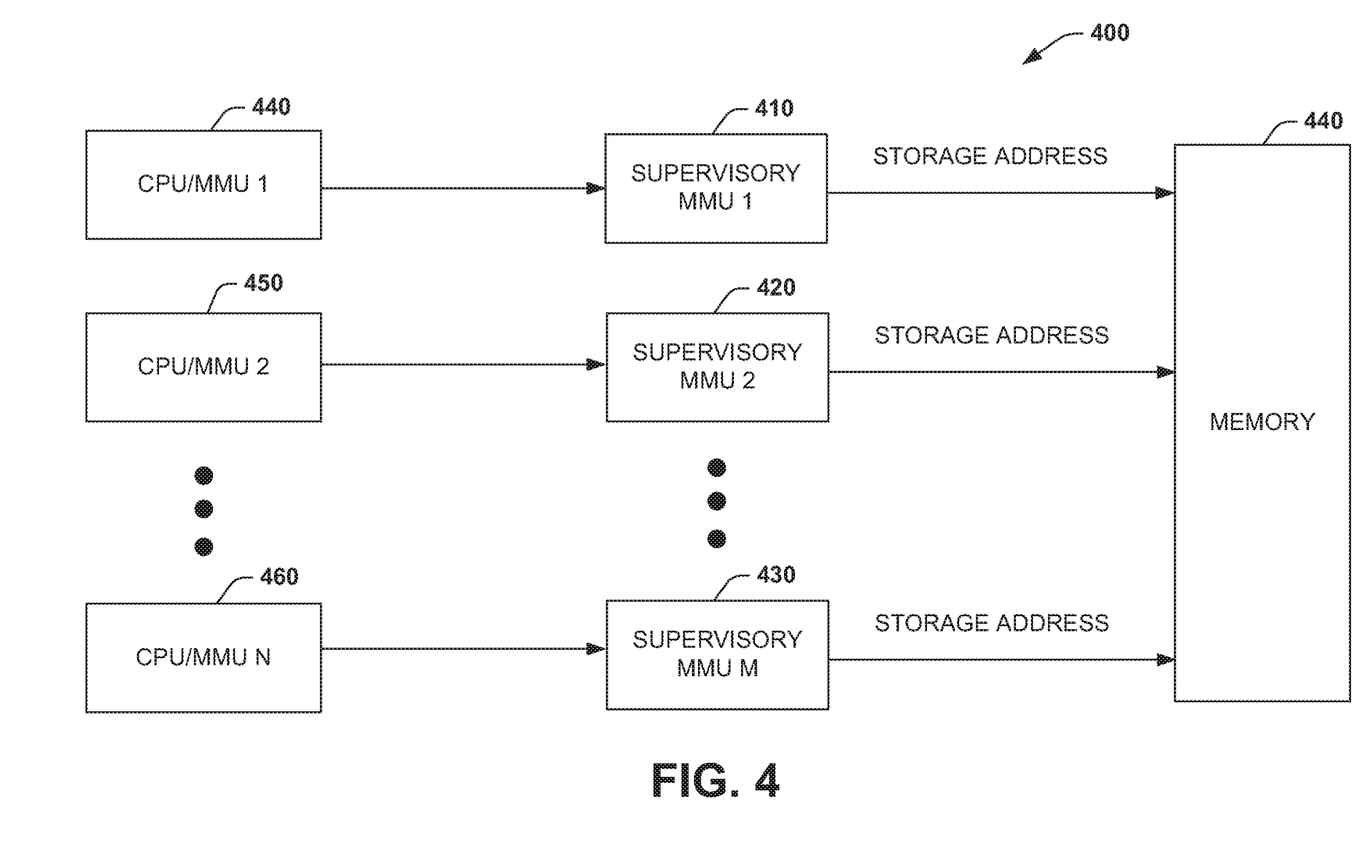
FIG. 4 illustrates an example of multiple processing units feeding multiple supervisory memory management units to control access to a common memory storage area.

FIG. 4 illustrates an example of multiple processing units feeding multiple supervisory memory management units to control access to a common memory storage area. In this example, multiple supervisory MMU's are shown at 410 through 430 to control access to a memory 440 where each of the supervisory MMU's is driven by a separate CPU/MMU shown at 440 through 460. In this example, the CPU/MMU's 440 through 460 perform first tier virtual to physical address translations. Each of the respective supervisory MMU's 410 through 440 can translate physical to storage addresses to the memory 440. Output from each of the supervisory MMU's can be combined on a common address bus if desired. In some examples, each of the supervisory MMU's can be assigned different regions of the memory 440 to manage. In other examples, they may map common regions for shared access by multiple CPU's 410.

Figure 5:
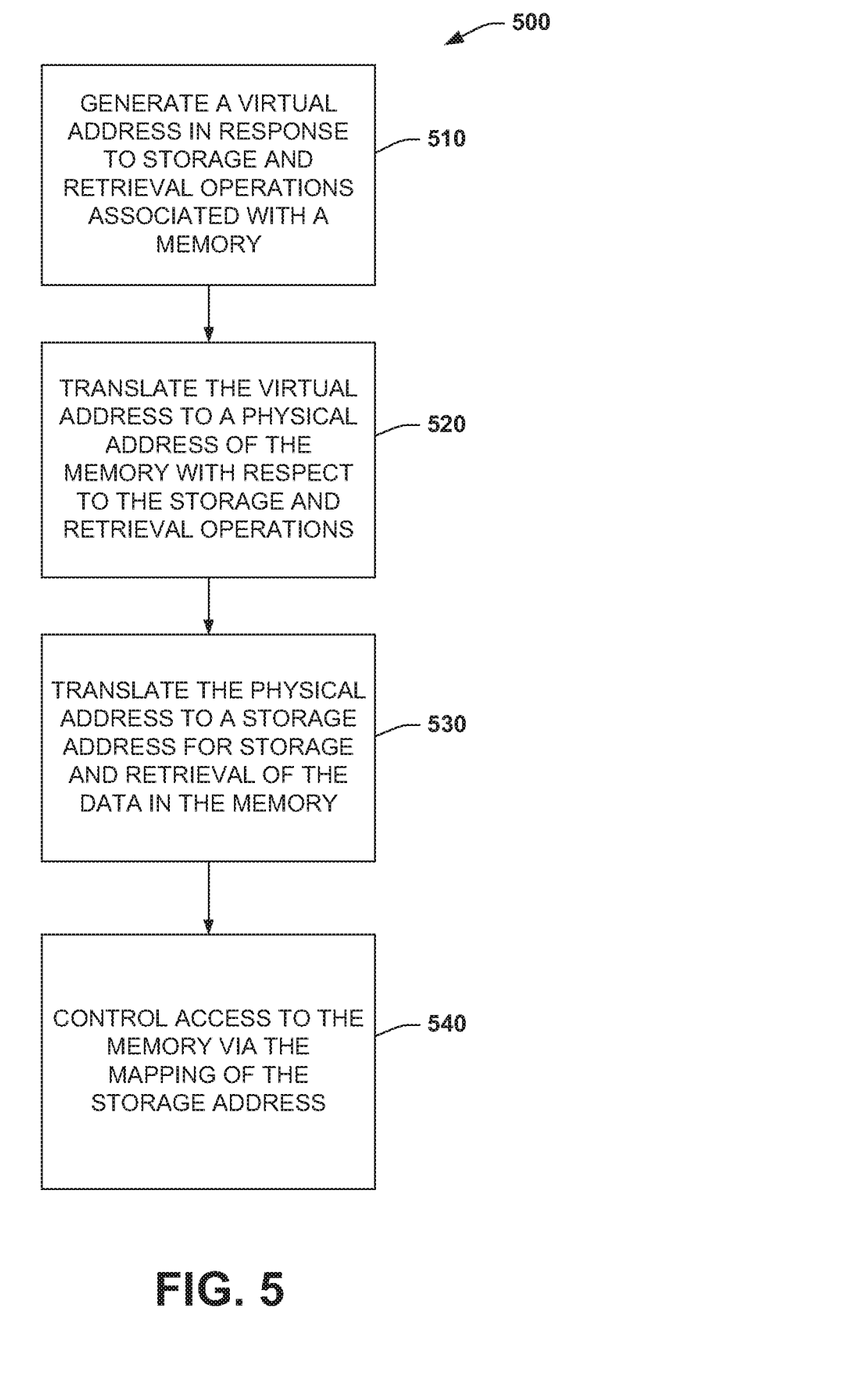
FIG. 5 illustrates an example of a method to control access to a common memory storage area utilized by multiple processing units.

In view of the foregoing structural and functional features described above, an example method will be better appreciated with reference to FIG. 5. While, for purposes of simplicity of explanation, the method is shown and described as executing serially, it is to be understood and appreciated that the method is not limited by the illustrated order, as parts of the method could occur in different orders and/or concurrently from that shown and described herein.

Such method can be executed by various components and executed by an integrated circuit, computer. or a controller, for example.

FIG. 5 illustrates an example of a method 500 to control access to a common memory storage area utilized by multiple processing units. At 510, method 500 includes generating a virtual address in response to storage and retrieval operations associated with a memory (e.g., via CPU 120 and MMU 140 of FIG. 1). At 520, the method 500 includes translating the virtual address to a physical address of the memory with respect to the storage and retrieval operations (e.g., via CPU 120 and MMU 140 of FIG. 1). At 530, the method 500 includes translating the physical address to a storage address for storage and retrieval of the data in the memory (e.g., via supervisory MMU 110 of FIG. 1). At 540, the method 500 includes controlling access to the memory via the mapping of the storage address. Although not shown, the method 500 can also include employing permissions stored in the storage page table to control access to the memory (e.g., processor A has permissions enumerated for storage address blocks 2 and 3, processor B has permissions enumerated for stage address blocks 3, 4, and 5).

Figure 6:
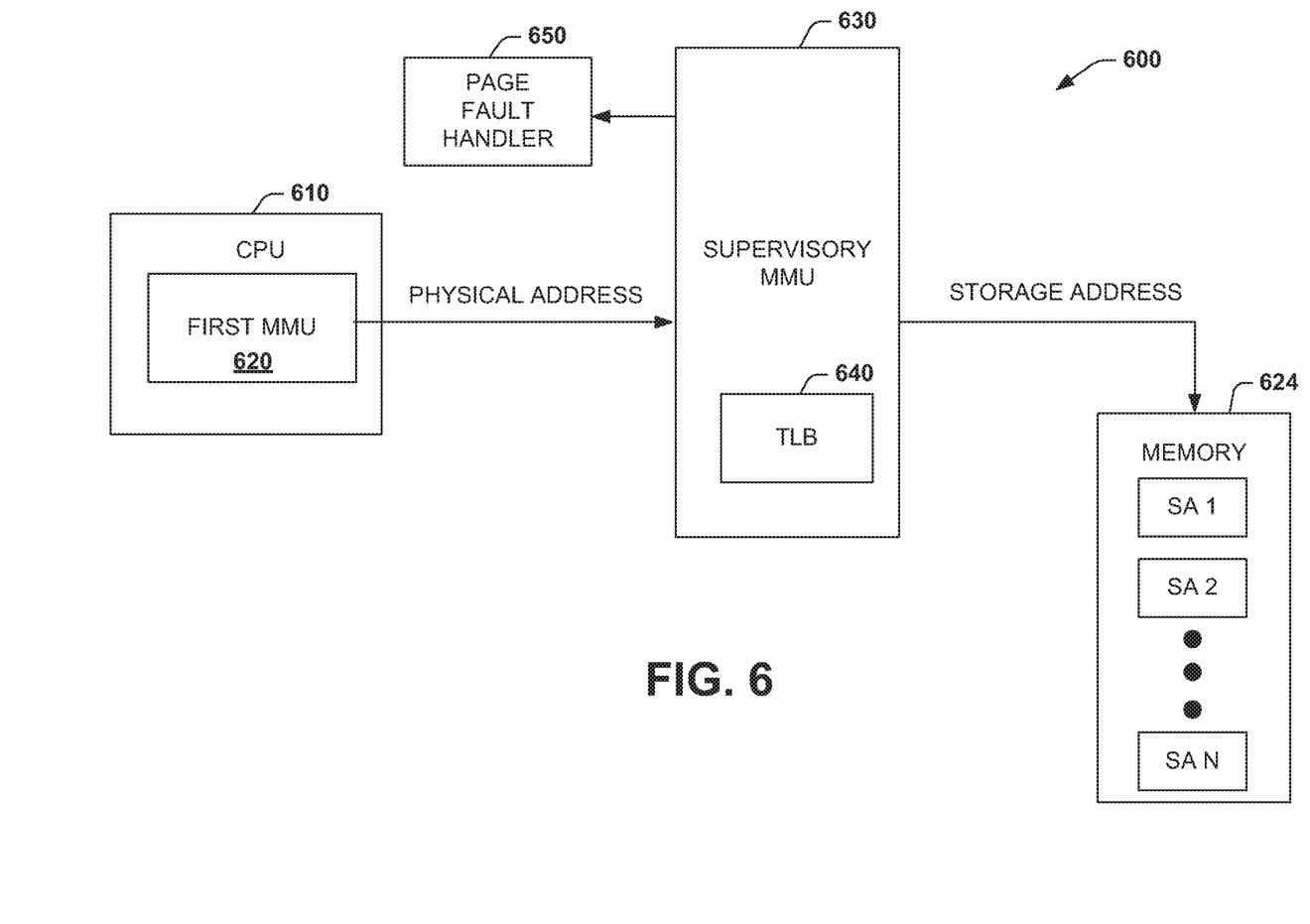
FIG. 6 illustrates an example of a system that employs a supervisory memory management unit and translation lookaside buffer (TLB) to control access to a common memory storage area utilized by multiple processing units.

FIG. 6 illustrates an example of a system 600 that employs a supervisory memory management unit and translation lookaside buffer (TLB) to control access to a common memory storage area utilized by multiple processing units. The system 600 includes a central processing unit (CPU) 610 to process data with respect to a virtual address generated by the CPU. A first memory management unit (MMU) 620 translates the virtual address to a physical address of a memory 624 with respect to the data processed by the CPU 610. A supervisory MMU 630 translates the physical address of the first MMU 620 to a storage address for storage and retrieval of the data in the memory 624. The supervisory MMU 630 utilizes a translation lookaside buffer (TLB) 640 to translate the physical address of the first MMU 620 to the storage address. The supervisory MMU 630 performs an external storage page table operation to the memory 624 if storage address is not located in the TLB 640. A page fault handler 650 responds to a fault generated by the supervisory MMU 630. The fault can be issued in response to the storage page table operation being performed by the supervisory MMU 630. As illustrated and described above with respect to FIG. 2, the CPU 610 can receive notice of a page table error generated by the supervisory MMU 630 via a fault feedback path from the page fault handler 650 to the CPU 610. The supervisory MMU 630 and the CPU 610 can utilize a polled semaphore, for example, to coordinate fault operations in response to the page table error.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A computer system, comprising:
   a central processing unit (CPU) to process a memory access request corresponding to a virtual address;
   a first memory management unit (MMU) to:
      determine a first mapping between the virtual address and a physical address of a physical address space of a memory device;
      determine a first permission for accessing the memory device based on a physical address range associated with the first mapping; and
      translate the virtual address to the physical address of-based on the first mapping; and
   a supervisory MMU to:
      determine a second mapping between the physical address and a storage address of a storage address space of the memory device;
      determine a second permission for accessing the storage address for facilitating the memory access request; and
      translate the physical address to the storage address based on the second mapping;
   wherein the supervisory MMU controls access to the memory device via the storage address space, and
   wherein the memory device includes a combination of volatile and non-volatile memory devices corresponding to the storage address space, and wherein the physical address space corresponds to the volatile memory device.

2. The computer system of claim 1, wherein the first MMU is further to translate the virtual memory address to the physical address based on a first translation lookaside buffer (TLB) of the first MMU.

3. The computer system of claim 1, wherein the supervisory MMU is further to translate the physical address to the storage address based on a second translation lookaside buffer (TLB) of the supervisory MMU.

4. The computer system of claim 1, wherein the supervisory MMU determines the second permission from a storage page table storing the storage address.

5. The computer system of claim 1, further comprising a supervisory fault handler to access a storage page table in the memory device in response to a supervisory page fault generated by the supervisory MMU.

6. The computer system of claim 5, wherein the CPU is further to receive a notice of the supervisory page fault via a fault feedback path from the supervisory fault handler to the CPU.

7. The computer system of claim 6, wherein the supervisory MMU and the CPU are to utilize a polled semaphore to coordinate fault operations in response to the supervisory fault.

8. The computer system of claim 1, wherein the memory device is to store a memory page table accessible by the first MMU via a first memory access path from the first MMU, wherein the first memory access path is accessible in response to a TLB cache miss of the first MMU.

9. The computer system of claim 1, wherein the memory device is to store a storage page table accessible via a second memory access path from the supervisory MMU or a third memory access path from a supervisory fault handler associated with the supervisory MMU.

10. The computer system of claim 1, wherein a location indicated by the storage address is accessible via a fourth memory access path via the supervisory MMU, wherein the fourth memory access path facilitates an in-band read operation.

11. An apparatus, comprising:
a memory device comprising a combination of volatile and non-volatile memory devices corresponding to a storage address space;
a central processing unit (CPU) to process a memory access request corresponding to a virtual address;
a first memory management unit (MMU) to:
   determine a first mapping between the virtual address and a physical address of a physical address space of the memory device;
   determine a first permission for accessing the memory device based on a physical address range associated with the first mapping; and
   translate the virtual address to the physical address ef-based on the first mapping; and
a supervisory MMU to:
   determine a second mapping between the physical address and a storage address of the storage address space of the memory device;
   determine a second permission for accessing the storage address for facilitating the memory access request; and
   translate the physical address to the storage address based on the second mapping;
wherein the supervisory MMU controls access to the memory device via the storage address space, and
wherein the physical address space corresponds to the volatile memory device.

12. A method, comprising:
processing, by a central processing unit (CPU) of a computing device, a memory access request corresponding to a virtual address;
determining, by a first memory management unit (MMU) of the computing device, a first mapping of the virtual address and a physical address of a physical address space of a memory device;
determining, by the first MMU, a first permission for accessing the memory device based on a physical address range associated with the first mapping;
translating, by the first MMU, the virtual address to the physical address of-based on the first mapping;
determining, by a supervisory MMU of the computing device, a second mapping between the physical address and a storage address of a storage address space of the memory device;
determining, by the supervisory MMU, a second permission for accessing the storage address for facilitating the memory access request; and
translating, by the supervisory MMU, the physical address to the storage address based on the second mapping;
wherein the supervisory MMU controls access to the memory device via the storage address space,
wherein the memory device includes a combination of volatile and non-volatile memory devices corresponding to the storage address space, and wherein the physical address space corresponds to the volatile memory device.

13. The method of claim 12, further comprising determining, by the supervisory MMU, the second permission from a storage page table storing the storage address.

14. The method of claim 12, further comprising:
translating, by the first MMU, the virtual memory address to the physical address based on a first translation lookaside buffer (TLB) of the first MMU; and
translating, by the supervisory MMU, the physical address to the storage address based on a second translation lookaside buffer (TLB) of the supervisory MMU.

15. The method of claim 12, further comprising accessing, by a supervisory fault handler of the computing device, a storage page table in the memory device in response to a supervisory page fault generated by the supervisory MMU.

16. The method of claim 15, further comprising receiving, by the CPU, a notice of the supervisory page fault via a fault feedback path from the supervisory fault handler to the CPU.

17. The method of claim 16, further comprising utilizing, by the supervisory MMU and the CPU, a polled semaphore to coordinate fault operations in response to the supervisory fault.

18. The method of claim 12, further comprising storing, in the memory device, a memory page table accessible by the first MMU via a first memory access path from the first MMU, wherein the first memory access path is accessible in response to a TLB cache miss of the first MMU.

19. The method of claim 12, further comprising storing, in the memory device, a storage page table accessible via a second memory access path from the supervisory MMU or a third memory access path from a supervisory fault handler associated with the supervisory MMU.

20. The method of claim 12, wherein a location indicated by the storage address is accessible via a fourth memory access path via the supervisory MMU, wherein the fourth memory access path facilitates an in-band read operation.

* * * * *